O. GERDE & H. P. KELLY.
LAWN MOWER SHARPENING DEVICE.
APPLICATION FILED SEPT. 27, 1909.

982,423.

Patented Jan. 24, 1911.

Witnesses.
A. H. Opsahl.
E. C. Skinkle

Inventors.
Otto Gerde.
Hans P. Kelly
By their Attorneys.
Williamson Merchant

UNITED STATES PATENT OFFICE.

OTTO GERDE AND HANS P. KELLY, OF MINNEAPOLIS, MINNESOTA.

LAWN-MOWER-SHARPENING DEVICE.

982,423.  Specification of Letters Patent.  Patented Jan. 24, 1911.

Application filed September 27, 1909. Serial No. 519,665.

*To all whom it may concern:*

Be it known that we, OTTO GERDE and HANS P. KELLY, citizens of the United States, residing at Minneapolis, in the county of Hennepin and State of Minnesota, have invented certain new and useful Improvements in Lawn-Mower-Sharpening Devices; and we do hereby declare the following to be a full, clear, and exact description of the invention, such as will enable others skilled in the art to which it appertains to make and use the same.

Our invention has for its object to provide a simple and highly efficient device for sharpening the blades of lawn mowers, and to this end it consists of the novel devices and combinations of devices hereinafter described and defined in the claims.

In the accompanying drawings, which illustrate the invention, like characters indicate like parts throughout the several views.

Figure 1:
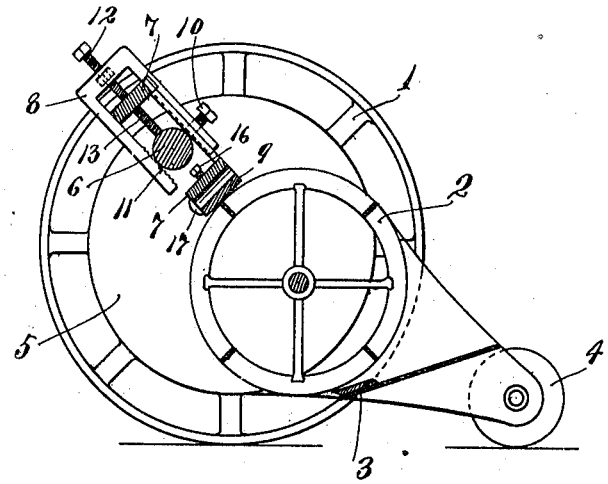
Figure 2:
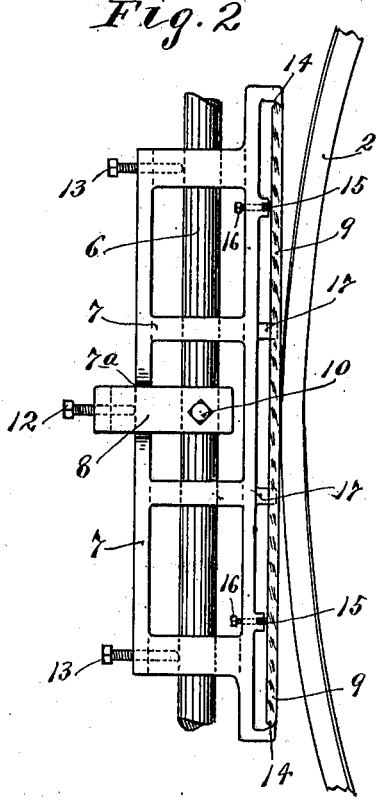
Figure 3:
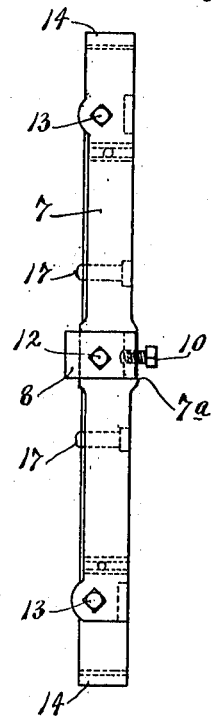

Referring to the drawings, Figure 1 is a view in vertical section taken centrally through the lawn mower from front toward the rear, and showing the improved sharpener applied in working position thereon, some parts of the mower being removed; Fig. 2 is a fragmentary plan view showing the sharpening device and a portion of one of the blades of the lawn mower; and Fig. 3 is an elevation of the sharpening device removed from working position.

Of the parts of the lawn mower, the numeral 1 indicates the traction wheels, the numeral 2 the spiral cutting blades, the numeral 3 the fixed cutting bar, the numeral 4 the rear supporting roller, the numeral 5 the non-rotary gear cases, and the numeral 6 a transverse tie rod which rigidly connects the two laterally spaced gear cases 5. These parts are of standard construction and further description thereof is not deemed necessary. The transverse tie rod 6 serves to support the blade sharpening device.

The blade sharpening device comprises three main elements or members, to-wit, a skeleton rectangular supporting frame 7, a so-called fulcrum bracket 8 and a straight flat faced file 9. The bracket 8 is U-shaped and its open end is adapted to straddle the intermediate portion of the rod 6 and to be rigidly secured thereto by a set screw 10 which works with threaded engagement through one of the arms of the said bracket, the other arm of said bracket being preferably serrated on its inner surface at 11, for engagement with the rod 6, or if desired, opposing set screws may be applied in the arms of the said bracket for engagement with the opposite side of the said rod. The inner and outer laterally spaced bar portions of the frame 7 are rigidly tied together by short connecting portions located above the rod 6 and approximately in the plane of the upper arm of the bracket 8. The outer bar of the frame 7, at its central upper portion, is provided with a notch $7^a$ that affords a seat for the upper arm of the fulcrum bracket 8. A set screw 12, which works with threaded engagement through the back of the fulcrum bracket 8, engages the central outer portion of the frame 7 and affords a fulcrum on which the frame 7 may be rocked. It also affords a base reaction for set screws 13 working with threaded engagement through the outer ends of the outer bar of said frame 7 and impinging against the rod 6. The inner bar of the frame 7, at its ends, is provided with dovetailed holding lugs 14, the inner surfaces of which converge in a direction toward the blades 2 and are adapted to engage the beveled ends of the file 9 and thereby limit the lateral movement of the file in a direction away from the frame 7. Also the inner bar of said frame 7 is provided with adjustable presser blocks 15, preferably of wood, that engage the inner face of the file and are adapted to be forced against the file by small set screws 16 having threaded engagement with the said inner bar of the frame 7. The file is firmly secured to the frame 7 when the set screws 16 are adjusted, so as to force the blocks 15 against the file and the beveled ends of the file against the lugs 14. Also, as shown, the rear bar of the frame 7 is provided on its lower edge with projecting lugs 17 that limit the downward movement of the file, in respect to the frame 7.

As is evident, by adjustments of the set screws 12 and 13, the frame 7 may be rigidly secured on the rod 6 and may be set in different adjustments thereon, so that the file will properly engage and act upon the cutting blades 2. For instance, adjustments of the set screw 12 will determine the setting of the central portion of the file in respect to the cutting blades 2 and, by adjustments of the set screws 13, the frame 7 may be rocked on the set screw 12 as the fulcrum and set in different positions, either parallel with or slightly at an angle to the rod 6, thereby properly setting the end portions of the file for action on the said blades 2. These adjustments enable the person using the sharpening device first to observe what parts of the cutting blades 2 need sharpening and then, to adjust the device to sharpen the blades accordingly.

The entire device is of small cost, may be very quickly and easily applied to the lawn mower and, when applied and properly adjusted, will very rapidly sharpen the blades. Instead of a file, a bar of carborundum or other sharpening material may be employed, if desired.

What we claim is:

1. The combination with a lawn mower having rotary cutting blades and a relatively fixed transverse rod, of a blade sharpening device comprising a fulcrum bracket secured to said rod, a frame adjustably fulcrumed to said bracket and having adjusting means for engagement with said rod, and a sharpening tool held by said frame in position for action on said cutting blade, substantially as described.

2. The combination with a lawn mower having rotary cutting blades and a relatively fixed transverse rod, of a blade sharpening device comprising a centrally located fulcrum bracket having means for detachably securing the same to said rod, a frame adjustably fulcrumed to said bracket and having set screws for engagement with said rod on opposite sides of said fulcrum bracket, and a file or sharpening tool detachably held by said frame in position for action on said cutting blades, substantially as described.

3. The combination with a lawn mower having rotary cutting blades and a relatively fixed transverse rod, of a blade sharpening device comprising an approximately U-shaped fulcrum bracket having in one of its arms a set screw for clamping said rod, and having in its back a set screw, a frame adjustably connected to said fulcrum bracket and fulcrumed on the set screw in the back thereof, set screws in the outer end portions of said frame engageable with said rod on opposite sides of said fulcrum bracket, and a file or sharpening tool detachably held by the inner portion of said frame in position for action on said cutting blades, substantially as described.

In testimony whereof we affix our signatures in presence of two witnesses.

OTTO GERDE.
HANS P. KELLY.

Witnesses:
HARRY D. KILGORE,
ALICE V. SWANSON.